(12) United States Patent
Liu

(10) Patent No.: US 7,000,059 B2
(45) Date of Patent: Feb. 14, 2006

(54) INTEGRATED PCI INTERFACE CARD AND BUS SYSTEM THEREOF

(75) Inventor: Meng-Hsien Liu, PaTe (TW)

(73) Assignee: Leadtek Research Inc., Taipei Hsien (TW)

( * ) Notice: Subject to any disclaimer, the term of this patent is extended or adjusted under 35 U.S.C. 154(b) by 148 days.

(21) Appl. No.: 10/607,911

(22) Filed: Jun. 27, 2003

(65) Prior Publication Data
US 2004/0068596 A1    Apr. 8, 2004

(30) Foreign Application Priority Data
Oct. 4, 2002  (TW) ............................ 91123057 A

(51) Int. Cl.
*G06F 13/36* (2006.01)
(52) U.S. Cl. ................. 710/309; 710/51; 710/110; 710/113; 710/260
(58) Field of Classification Search ............. 710/8–10, 710/36–41, 48, 51, 62, 64, 300–302, 110–111, 710/120, 305, 306, 314, 244, 260, 113, 309
See application file for complete search history.

(56) References Cited

U.S. PATENT DOCUMENTS

| | | | | |
|---|---|---|---|---|
| 5,594,882 A | * | 1/1997 | Bell | 711/212 |
| 5,832,238 A | * | 11/1998 | Helms | 710/105 |
| 5,944,805 A | * | 8/1999 | Ricks et al. | 710/107 |
| 6,199,123 B1 | | 3/2001 | Simonich et al. | |
| 6,408,347 B1 | * | 6/2002 | Smith et al. | 710/36 |

OTHER PUBLICATIONS

How the PCI Bus Works, Tech-Pro.*
PCI Bus Arbiter, Altera.*
PCI Local Bus Technical Summary.*

* cited by examiner

*Primary Examiner*—Khanh Dang
(74) *Attorney, Agent, or Firm*—Seyfarth Shaw LLP

(57) ABSTRACT

The present invention discloses an integrated PCI interface card and the bus system thereof. The integrated PCI interface card of the present invention includes at least two bus masters, a control unit and one multiplexer. The control unit is used in generating the bus request and bus acknowledge signals of the at least two bus masters. The multiplexer is used in selecting an unused address line to be the identification selection signal of one of the at least two bus masters.

8 Claims, 4 Drawing Sheets

INTEGRATED PCI INTERFACE CARD AND BUS SYSTEM THEREOF

BACKGROUND OF THE INVENTION (A) Field of the Invention

The present invention relates to an integrated peripheral component interconnect (PCI) interface card and its bus system, particularly to a PCI interface card that integrates at least two bus masters and the bus system thereof.

(B) Description of Related Art

PCI slots have become an industrial standard of personal computers, and acts as a conjunction channel for high performance PCI interfaces cards and processors. The PCI interface card, such as sound card, modem, display card, and TV tune card, etc. achieves 100 MB data exchange with the processor by being inserted into the PCI slot of 32-bit bus width.

On a PCI interface card, sometimes there might be more than two bus masters, and in such case a PCI bridge is needed to designate a bus authority between these bus masters, and distribute I/O ports and the start address and size of the memory.

The prior art PCI bus system is illustrated in FIG. 1. The motherboard end of personal computers comprises a PCI host controller 11, such as the north bridge in a chipset. The PCI host controller 11 can be used in arbitrating which one of the PCI interface cards installed in the PCI slots can obtain the bus authority. The interface card end comprises three interface cards, which are first PCI interface card 12, second PCI interface card 13 and third PCI interface card 14, wherein the first PCI interface card 12 comprises a first bus master 121, a second bus master 122 and a PCI bridge 16, and the second PCI interface card 13 and third PCI interface card 14 comprise third bus master 131 and fourth bus master 141, respectively. As the first PCI interface card 12 comprises two bus masters, a PCI Bridge 16 should be added to designate a bus authority.

The drawbacks of the using PCI bridge 16 are as follows:
1. the framework of the drive software needs to be changed;
2. the overall performance is lowered; and
3. the overall costs are higher.

With the popularity of PCI interface cards that comprise multiple bus masters, it becomes a prominent issue to figure out how to raise the performance of the interface cards and lower their costs.

SUMMARY OF THE INVENTION

The main object of the present invention is to provide an integrated PCI interface card and its bus system, which are capable of accomplishing correct data access on PCI interface cards that comprise multiple bus masters without the assistance of the conventional PCI bridge.

In order to fulfill the above-mentioned object, the integrated PCI interface card of the present invention includes at least two bus masters, a control unit and one multiplexer. The control unit is used in generating the bus request and bus acknowledge signals of the at least two bus masters. The multiplexer is used in selecting an unused address line to be the identification selection signal of one of the at least two bus masters.

The integrated PCI bus system of the present invention comprises at least one integrated PCI interface card, a PCI host controller, at least one bus request signal, at least one bus acknowledge signal and at least one identification selection signal. The PCI host controller is used in arbitrating which PCI interface card owns use permission. The at least one bus request signal is issued from the at least one integrated PCI interface card to the PCI host controller. The at least one bus acknowledge signal is issued from the PCI host controller to respond to the request of the at least one integrated PCI interface card. The at least one identification selection signal is issued from the PCI host controller for selecting and starting one of the bus masters in the integrated PCI interface card.

The integrated PCI interface card of the present invention can generate at least the following advantages:
1. the framework of drive software is unchanged, due to not adding hardware that is sufficient to affect system modules;
2. the overall performance is improved, as many unnecessary control signals are eliminated; and
3. the overall costs are lowered, as the PCI bridge is omitted.

BRIEF DESCRIPTION OF THE DRAWINGS

The present invention will be described according to the appended drawings in which.

DETAILED DESCRIPTION OF PREFERRED EMBODIMENT

Figure 1:
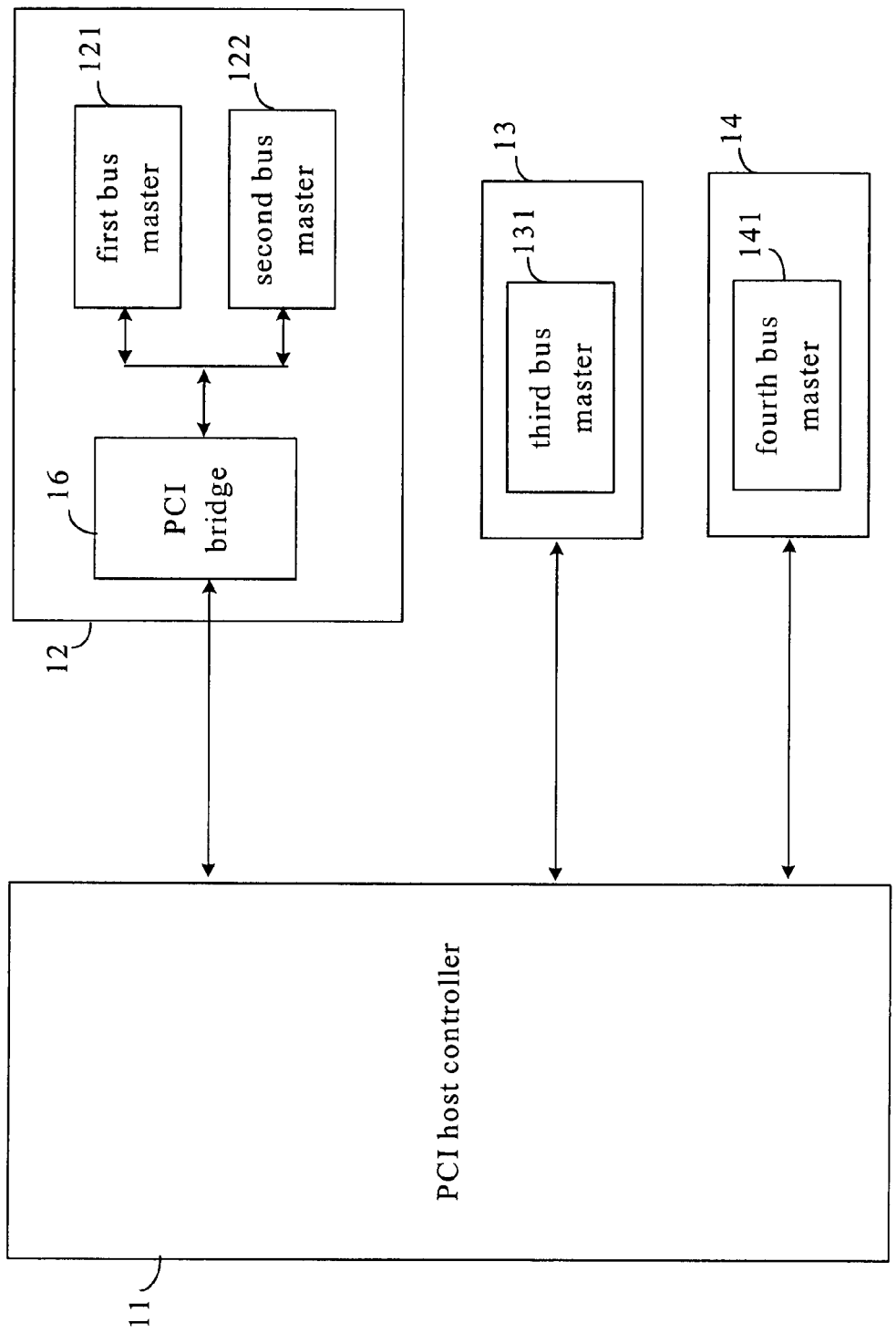
FIG. 1 shows a prior art PCI bus system.
Figure 2:
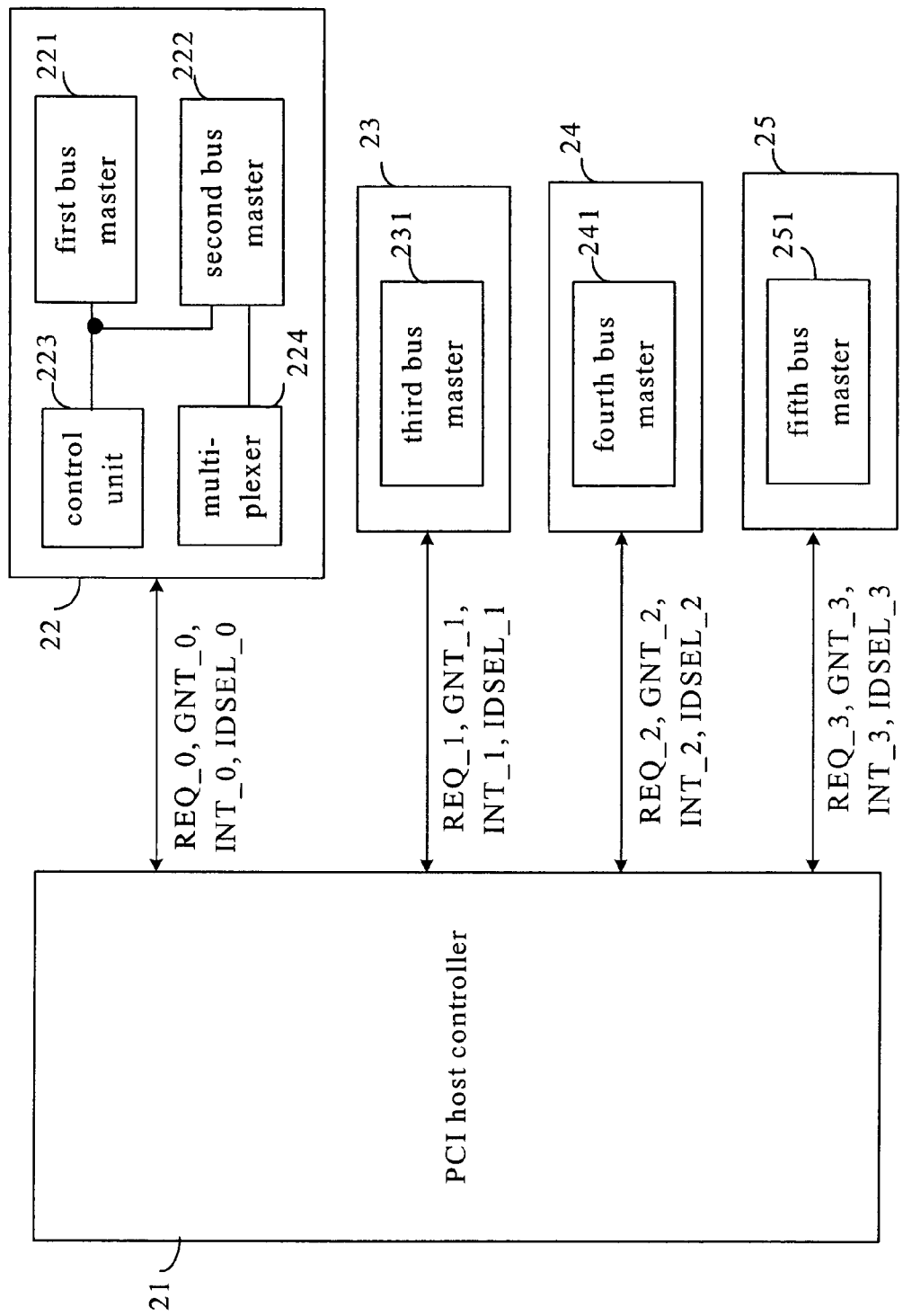
FIG. 2 shows a PCI bus system according to the present invention.

The PCI bus system of the present invention is illustrated in FIG. 2. One of the technical characteristics of the present invention lies in a first PCI interface card (integrated PCI interface card) 22 that comprises multiple bus masters being away from the PCI Bridge of the prior art. In order for PCI host controller 21 to be able to distinguish the difference between the first bus master 221 and the second bus master 222, which are located on the first PCI interface card 22, the present invention makes them show the difference right upon the designing of the control circuits.

Figure 3:
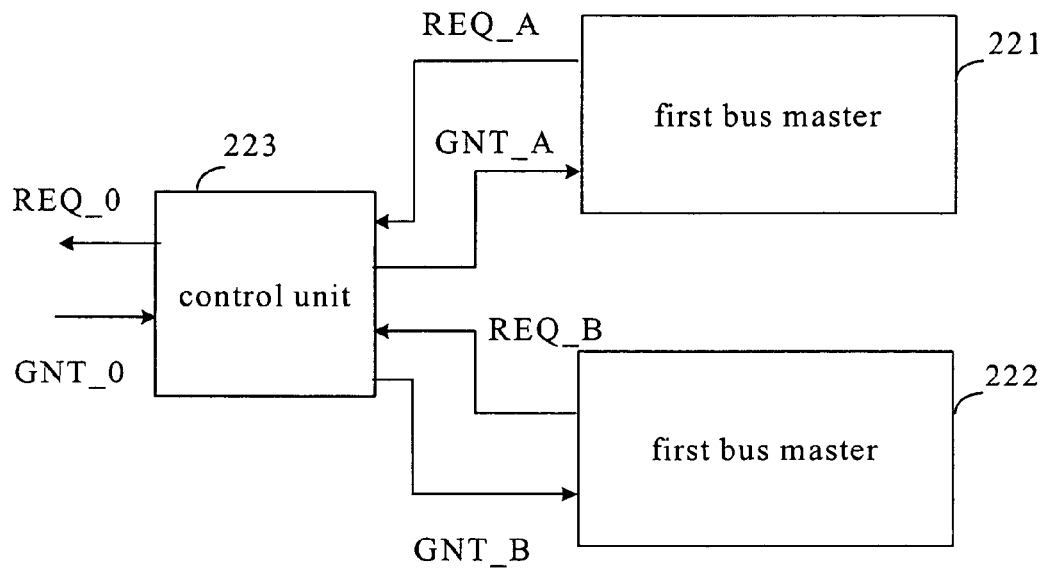
FIG. 3 shows a preferred embodiment of the integrated PCI interface card of the present invention.

Firstly, the control signals between the PCI host controller 21 and the first through the fourth PCI interface cards 22~25 include REQ_0 through REQ_3, GNT_0 through GNT_3, INT_0 through INT_3, and IDSEL_0 through IDSEL_3. A REQ (bus request) signal line represents that a bus master sends a request of hoping to obtain the PCI bus to the PCI host controller 21, while GNT (bus acknowledge) signal line represents that the PCI host controller 21 consents to have the bus master obtain the PCI bus. As there is only one set of control signal lines of REQ_0 and GNT_0 between the first PCI interface card 22 and the PCI host controller 21, in order to tell the difference of REQ and GNT signal lines on the first bus master 221 and second bus master 222, the first interface card 22 additionally includes a control unit 223 for generating corresponding REQ_A and GNT_A for use by first bus master 221, and REQ_B and GNT_B for use by second bus master 222, according to a finite state machine, as illustrated in FIG. 3.

The algorithm of the finite state machine is as follows:

```
/ * As stated below is an example of a PCI interface card that comprises
three bus masters, but yet the number of bus masters can vary, depending
on the needs in actual practice * /
    State START
    Enter PCI_1
    State PCI_1:
        If REQ_A is activated then {keep state in PCI_1 and
            let REQ_0 be activated}
        Else if REQ_C is activated then keep state in PCI_3
            Else keep state in PCI_2;
        If GNT_0 is activated then keep GNT_A activated;
    State PCI_2:
        If REQ_B is activated then {keep state in PCI_2 and
            let REQ_0 be activated}
        Else if REQ_A is activated then keep state in PCI_1
            Else keep state in PCI_3
        If GNT_0 is activated then keep GNT_B activated;
    State PCI_3:
        If REQ_C is activated then {keep state in PCI_3 and
            let REQ_0 be activated}
        Else if REQ_B is activated then keep state in PCI_2
            Else keep state in PCI_1
        If GNT_0 is activated then keep GNT_C activated;
    End.
```

INT (interrupt) control signal line is used in representing the generation of interruption. Due to the first bus master 221 and second bus master 222 being sharing the same interface card and the same bus slots, INT_0 can be connected to the first bus master 221 and the second bus master 222 at the same time without any conflict, while in actual practice, other alternatives, such as INT_1 or INT_2, can be designated for the second bus master 222.

IDSEL_0 (identification selection) control signal line is used in representing whether the PCI host controller 21 has selected the first interface card 22. However, in order for the PCI host controller 21 to further recognize the first bus master 221 and second bus master 222 being two different bus masters located on the first interface card 22, the present invention uses IDSEL_0 for acting a start mechanism for selecting the first bus master 221, while using an unused address line to act as a start mechanism for selecting the second bus master 222. The unused address line can be selected by means of scanning unused address lines by a software application after power start-up, and specified as the IDSEL signal line for the second bus master 222.

Figure 4:
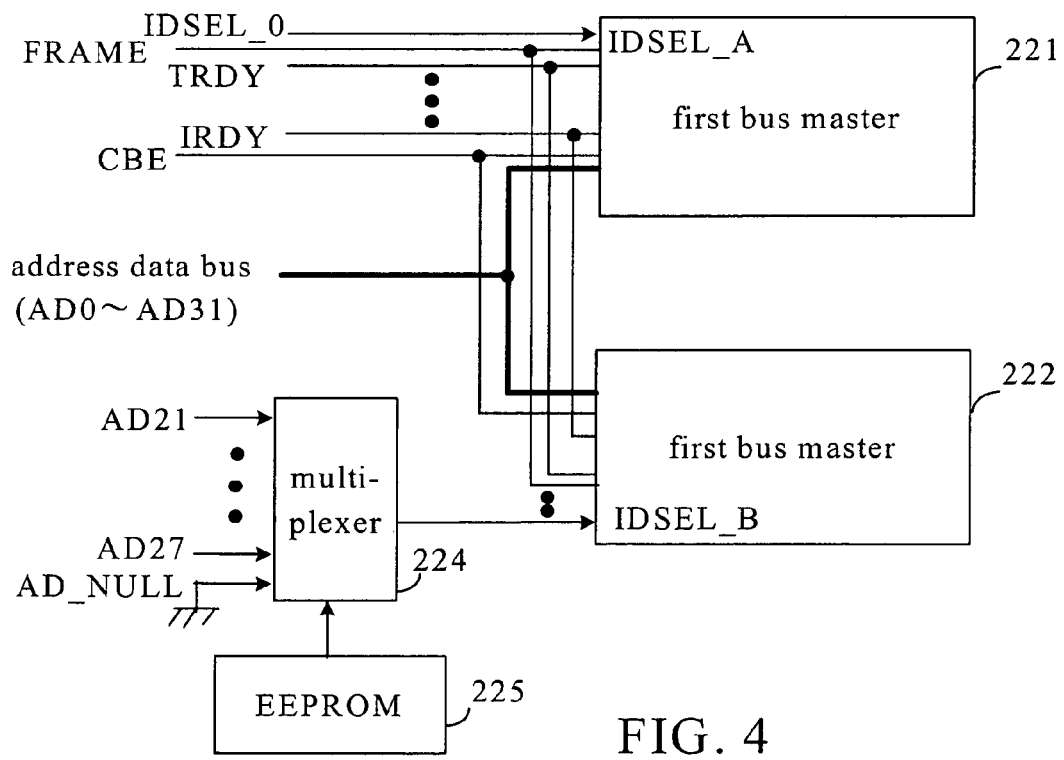
FIG. 4 shows another preferred embodiment of the integrated PCI interface card of the present invention.

FIG. 4 illustrates a preferred embodiment of the PCI interface card of the present invention. The first interface card 22 additionally comprises a multiplexer 224 and electronic erasable programming read-only memory (EEPROM) 225. Due to IDSEL_0 being used in selecting the first bus master 221, while the second bus master 222 being without corresponding selection signal line, the present invention can be designed, at power start-up, to have the default value of the EEPROM 225 select the AD_DULL of the multiplexer 224 as the initial selection signal line of the second bus master 222. Afterwards, a software program is used for scanning an unused address line (located between AD21 and AD27) so as to serve as the selection signal line of the second bus master 222.

Figure 5:
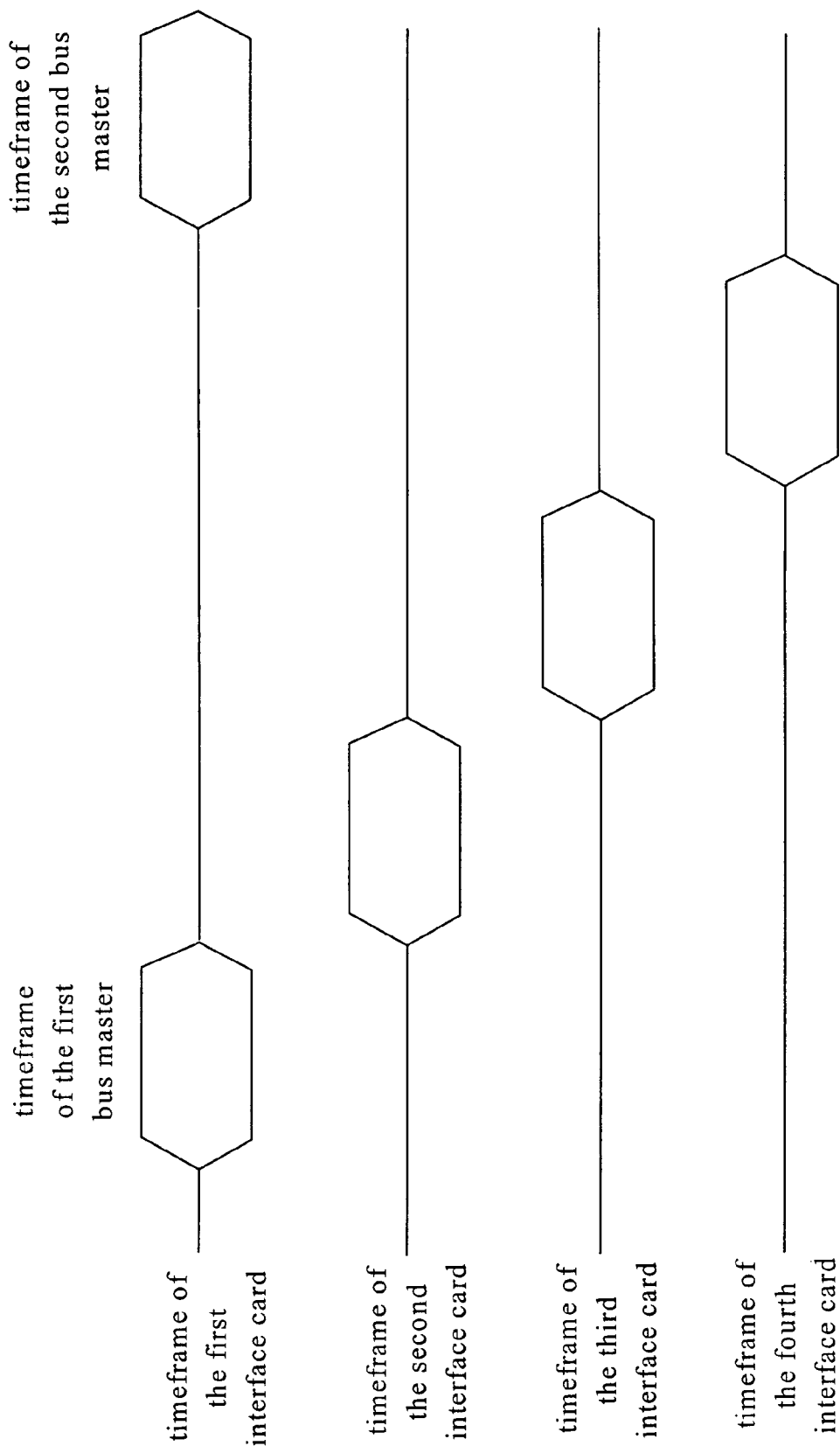
FIG. 5 shows a timing diagram of the PCI bus system according to the present invention.

FIG. 5 illustrates the timing diagram of the PCI bus system of the present invention, assuming that the system is at an extremely busy stage. As shown in the timing diagram, the first interface card 22 through the fourth interface card 25 takes rotating turns in using the PCI bus, and the first bus master 221 and the second bus master on the first interface card 22 also takes rotating turns in using the PCI bus timeframe taken up by the first interface card 22.

The above-described embodiments of the present invention are intended to be illustrative only. Numerous alternative embodiments may be devised by those skilled in the art without departing from the scope of the following claims.

What is claimed is:

1. An integrated PCI interface card used in a bus system including a PCI host controller, comprising:
    at least two bus masters;
    a control unit electrically connected to the at least two bus masters for controlling transmissions of bus request signals to the PCI host controller and bus acknowledge signals to the two bus masters;
    a multiplexer for selecting an unused address to act as an identification selection signal of one of the at least two bus masters; and
    an EEPROM electrically connected to the multiplexer for assigning an initial identification selection signal to one of the at least two bus masters at power start-up and recording the unused address after power start-up.

2. The integrated PCI interface card of claim 1, wherein the at least two bus masters share a same interrupt control signal.

3. An integrated PCI bus system, comprising:
    at least one integrated PCI interface card as recited in claim 1;
    a PCI host controller for arbitrating which PCI interface card owns use permission;
    at least one bus request signal issued by the at least one integrated PCI interface card to the PCI host controller;
    at least one bus acknowledge signal issued by the PCI host controller to the at least one integrated PCI interface card for replying the at least one bus request signal; and
    at least one identification selection signal issued by the PCI host controller for selecting one bus master of the integrated PCI interface card.

4. The integrated PCI bus system of claim 3, further comprising at least one PCI interface card having a single bus master.

5. The integrated PCI bus system of claim 3, wherein the at least two bus masters of the integrated PCI interface card share a same interrupt control signal.

6. The integrated PCI bus system of claim 3, wherein the PCI host controller assigns an unused address as another identification selection signal of the integrated PCI interface card by means of using a software program to scan unused address lines after power start-up.

7. The integrated PCI bus system of claim 3, wherein the at least two bus masters of the integrated PCI interface card own a use permission in a rotating turn.

8. An integrated PCI bus system, comprising:
    at least one integrated PCI interface card as recited in claim 1;
    a PCI host controller for arbitrating which PCI interface card owns use permission, wherein the PCI host controller assigns an unused address as another identification selection signal of the integrated PCI interface card by means of using a software program to scan unused address lines after power start-up;
    at least one bus request signal issued byte at least one integrated PCI interface card to the PCI host controller;
    at least one bus acknowledge signal issued by the PCI host controller to the at least one integrated PCI interface card for replying the at least one bus request signal; and
    at least one identification selection signal issued by the PCI host controller for selecting one bus master of the integrated PCI interface card.

* * * * *

UNITED STATES PATENT AND TRADEMARK OFFICE
CERTIFICATE OF CORRECTION

PATENT NO. : 7,000,059 B2
DATED : February 14, 2006
INVENTOR(S) : Meng-Hsien Liu It is certified that error appears in the above-identified patent and that said Letters Patent is hereby corrected as shown below:

Column 4,
Line 57, "byte" should be -- by the --.

Signed and Sealed this

Thirtieth Day of May, 2006

JON W. DUDAS
*Director of the United States Patent and Trademark Office*